US011702159B2

(12) United States Patent
Schwarz et al.

(10) Patent No.: US 11,702,159 B2
(45) Date of Patent: Jul. 18, 2023

(54) MOUNTING ARRANGEMENT FOR TENSIONING UNITS IN TRACKED UNDERCARRIAGES OF LARGE MACHINES

(71) Applicant: KOMATSU GERMANY GMBH, Düsseldorf (DE)

(72) Inventors: Henry Schwarz, Monheim (DE); Jens Junghans, Ratingen (DE); Matthias Rösch, Düsseldorf (DE); Sebastian Speldrich, Düsseldorf (DE)

(73) Assignee: KOMATSU GERMANY GMBH, Düsseldorf (DE)

( * ) Notice: Subject to any disclaimer, the term of this patent is extended or adjusted under 35 U.S.C. 154(b) by 626 days.

(21) Appl. No.: 16/632,196

(22) PCT Filed: Apr. 18, 2018

(86) PCT No.: PCT/EP2018/059840
§ 371 (c)(1),
(2) Date: Jan. 17, 2020

(87) PCT Pub. No.: WO2019/015817
PCT Pub. Date: Jan. 24, 2019

(65) Prior Publication Data
US 2020/0231231 A1    Jul. 23, 2020

(30) Foreign Application Priority Data
Jul. 20, 2017  (DE) .................... 10 2017 116 428.6

(51) Int. Cl.
*B62D 55/30* (2006.01)
*B62D 55/088* (2006.01)
*B62D 55/32* (2006.01)

(52) U.S. Cl.
CPC ........... *B62D 55/30* (2013.01); *B62D 55/088* (2013.01); *B62D 55/32* (2013.01)

(58) Field of Classification Search
CPC ....... B62D 55/088; B62D 55/30; B62D 55/32
See application file for complete search history.

(56) References Cited

U.S. PATENT DOCUMENTS 3,980,351 A * 9/1976 Orr ........................ B62D 55/30
                                                    305/149
4,323,283 A * 4/1982 Muramoto ............. B62D 55/30
                                                    305/147

(Continued)

FOREIGN PATENT DOCUMENTS

EP          2 230 160       9/2010
WO      WO 2011/153053     12/2011

OTHER PUBLICATIONS

International Search Report issued by the European Patent Office in International Application PCT/EP2018/059840 dated Jul. 23, 2018.

*Primary Examiner* — Tony H Winner
(74) *Attorney, Agent, or Firm* — Henry M. Feiereisen LLC

(57) ABSTRACT

A mounting arrangement for a tensioning device with a tensioning unit in a side carrier of a crawler of a tracked undercarriage in a large machine is disclosed. The tensioning unit is arranged in a side carrier compartment in the side carrier of the crawler, wherein a mounting opening is arranged in the side carrier on the outside thereof in an installation area of the tensioning unit for allowing removal of the tensioning unit, when installed, from the side carrier compartment through the mounting opening transversely to a track running direction.

7 Claims, 2 Drawing Sheets

(56) References Cited

U.S. PATENT DOCUMENTS

| | | | | |
|---|---|---|---|---|
| 5,045,030 A | * | 9/1991 | Cunningham | F16H 7/1263 |
| | | | | 474/138 |
| 6,024,183 A | * | 2/2000 | Dietz | B62D 55/30 |
| | | | | 180/9.1 |
| 7,866,420 B1 | * | 1/2011 | Claas | B62D 55/30 |
| | | | | 180/9.1 |
| 8,011,740 B2 | | 9/2011 | Matthys | |
| 2006/0108870 A1 | | 5/2006 | Livesay et al. | |
| 2007/0029878 A1 | * | 2/2007 | Gaudreault | E02F 9/02 |
| | | | | 305/130 |
| 2014/0284996 A1 | * | 9/2014 | Necib | B62D 55/305 |
| | | | | 305/145 |
| 2015/0175226 A1 | * | 6/2015 | Johnson | B62D 55/30 |
| | | | | 305/149 |
| 2016/0311481 A1 | * | 10/2016 | Grant | B62D 55/30 |
| 2017/0217517 A1 | * | 8/2017 | Bandil | B62D 55/14 |

* cited by examiner

MOUNTING ARRANGEMENT FOR TENSIONING UNITS IN TRACKED UNDERCARRIAGES OF LARGE MACHINES

CROSS-REFERENCES TO RELATED APPLICATIONS

This application is the U.S. National Stage of International Application No. PCT/EP2018/059840, filed Apr. 18, 2018, which designated the United States and has been published as International Publication No. WO 2019/015817 A1 and which claims the priority of German Patent Application, Serial No. 10 2017 116 428.6, filed Jul. 20, 2017, pursuant to 35 U.S.C. 119(a)-(d).

BACKGROUND OF THE INVENTION

The present invention relates to a mounting arrangement for a tensioning device with at least one tensioning unit in the side carrier of a crawler of tracked undercarriages in large machines.

In large machines, such as mining excavators in particular, the undercarriage typically includes two crawlers, each with a tracked undercarriage per side. The tracked undercarriage has a stable frame (side carrier designed as structural component), in which at least one idler wheel with at least one tensioning device for the crawler chain are arranged in addition to track rollers and idler rollers and a drive sprocket (tumbler). The driving power is transferred to the tumbler. The tensioning device maintains the crawler chain via the idler wheel at a desired tension, so that a reliable movement of the crawler track is made possible. In the event of shock loads or in the event of objects getting caught in the tracked undercarriage, the idler wheel gives way against the tensioning device.

Known from the prior art are tensioning systems having a tensioning device which includes, as the tensioning element, one or two parallel tensioning cylinders, which normally engage a tensioning fork that is mounted in the frame and acts on a sliding block which transmits the relative movements of the idler wheel when force is introduced. The tensioning unit can be a hydraulic tensioning cylinder, a mechanical tensioning unit or a compression spring.

Although these tensioning systems have proven themselves, they have the disadvantage that assembly, in the event of replacement, repair or maintenance of the tensioning unit, requires complicated dismantling from the tracked undercarriage of the respective crawler. To date, the tensioning units are pulled for this purpose from the side carriers of the crawler in installation direction and along the track running direction. In particular when large machines are involved, such tensioning units have very high weights, so that an exchange under operating conditions involves a considerable logistical effort in order to be able to change the tensioning unit safely and quickly from a side carrier of the crawler.

This leads to considerable additional expenditure in time, which in turn adversely affects the operating hours and thus the economic viability of such large machines. Downtimes should be kept as short as possible to keep the cost/benefit factor in the positive range.

It is therefore an object of the present invention to provide a mounting arrangement for a tensioning device with at least one tensioning unit in tracked undercarriages of large machines, which can overcome the afore-mentioned disadvantages. In particular, the mounting arrangement shah improve the service option for the user of such constructed large machines through service teams and risk of accidents during assembly work shall be reduced when handling the tensioning units.

SUMMARY OF THE INVENTION

This object is attained in accordance with the invention by a mounting arrangement for a tensioning device with at least one tensioning unit in the side carrier of a crawler of tracked undercarriges in large machines, wherein the tensioning unit is arranged in a side carrier compartment in the side carrier of the crawler, and a mounting opening is arranged in the side carrier on the outside thereof in the installation area of the tensioning unit for allowing removal of the tensioning unit there through from the side carrier compartment in the installed position transversely to the track running direction.

Advantageous further refinements are the subject matter of sub-claims.

The mounting arrangement according to the invention is characterized in that a mounting opening is arranged in the side carrier of the crawler on the outer sides thereof in the installation area of the tensioning unit, through which mounting opening the tensioning unit can be removed from the side carrier in the installation position and transversely to the track running direction.

In an advantageous embodiment of the mounting arrangement according to the invention, the mounting opening can be closed with a cover in a dust and water-repellent manner. The cover itself is configured such as to be robust and resistant to cope with the hard daily work routine. The cover can be made of a correspondingly massive steel plate.

In a further advantageous embodiment of the mounting arrangement according to the invention, the cover has on its longitudinal skies a first profile formed as an undercut, which can be brought into formfitting operative connection with a corresponding second profile on the longitudinal side of the mounting opening.

According to a further advantageous embodiment, provision is made for guide profiles to be associated to the longitudinal sides of the mounting opening for allowing insertion of the undercut of the cover plate.

In order to be able to safely remove the tensioning unit from the side carrier of the crawler, a further advantageous embodiment provides for guide profiles in the bottom of the side carrier compartment (installation area) for the tensioning unit transversely to the track running direction.

The guide profiles can be configured as rails into which a pullout unit can be inserted. As a result, the tensioning unit can be brought into operative connection with the pullout unit.

The pullout unit can be configured such that it can be matched to the shape and size (circumference) of the tensioning unit. For this purpose, retainers may be associated to the pullout unit to enable a locking of the tensioning unit in relation to the pullout unit so as to prevent the tensioning unit from inadvertently detaching from the pullout unit.

When the tensioning unit is securely mounted on the pullout unit, the tensioning unit with the pullout unit can be pulled out from the installation area transversely to the track running direction through the mounting opening. A latching for further transport of the tensioning unit is hereby considerably facilitated, since the tensioning unit can hereby be moved out laterally of the side carrier and completely to the outside of the installation area (side carrier compartment).

In a further embodiment, recesses are arranged transversely to the track running direction in the bottom of the side carrier compartment, Load-bearing means, for example, can be inserted into the recesses below the tensioning unit. Examples of load-bearing means may involve lever forks of a forklift or the like. As a result, the fork of a forklift can be moved more easily underneath the tensioning unit for subsequent removal from the side carrier compartment.

BRIEF DESCRIPTION OF THE DRAWING

An exemplary embodiment of the invention will be explained in greater detail hereinafter with reference to the accompanying drawings. The figures show in.

DETAILED DESCRIPTION OF PREFERRED EMBODIMENTS

Figure 1:
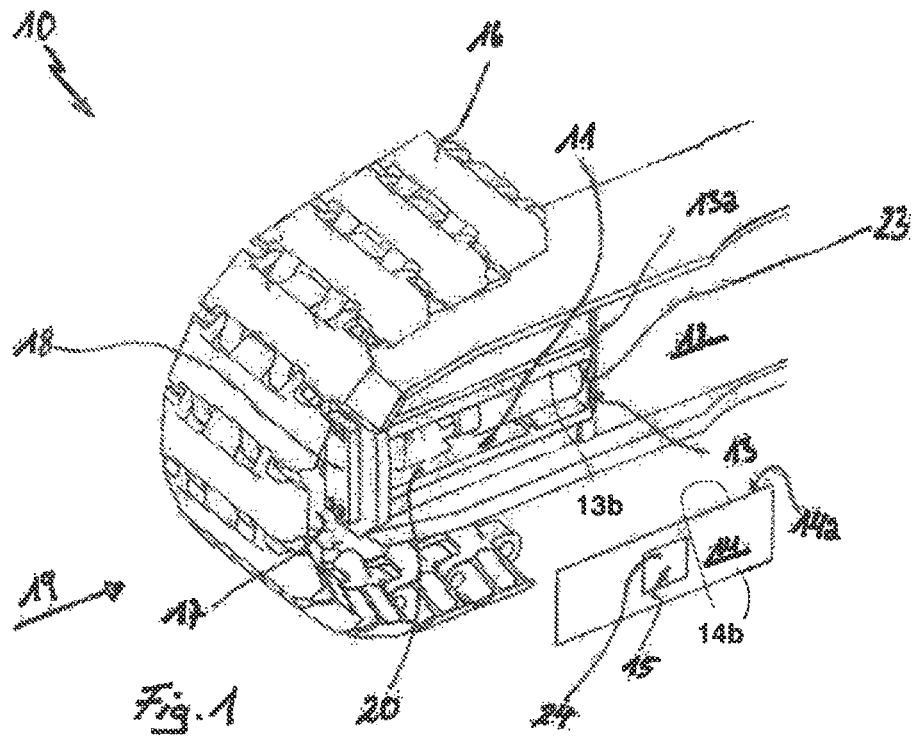
FIG. 1 an isometric view of the mounting arrangement according to the invention in a side carrier of a crawler of a large machine with open side carrier compartment and removed cover plate before removal of the tensioning unit from its installation area.

In the following, same features are designated with same reference signs. For ease of illustration, the reference numerals have not been repeated in every figure for every feature shown. As shown in FIG. 1, the mounting arrangement 10 essentially includes an installation area 11 which is arranged in a side carrier 12 of a crawler of a large machine, in particular a mining excavator (neither of which is shown). The installation area 11 is configured as a side carrier compartment 12a, which in the installed position is provided on the outside of the side carrier 12 with a mounting opening 13.

The mounting opening 13 can be dosed with a cover 14 designed as a plate (configured in this embodiment as a cover plate). An inspection opening 15 is associated in this embodiment to the cover 14 and can be provided with a sight glass 24 in order to be able to carry out a visual inspection of the machine components arranged in the mounting opening at any time. The cover 14 has on its longitudinal sides 14a a first profile which is configured as an undercut 14b and which can be brought into formfitting operative connection with a corresponding second, or guide profile 13b on the longitudinal side 13a of the mounting opening 13. Provision is made for guide profiles 13b to be associated to the longitudinal sides 13a of the mounting opening 13 for allowing insertion of the undercut 14b of the cover plate 14.

A tensioning unit 12b is arranged in the compartment 12a of the side carrier 12. The tensioning unit 12b is hereby mounted between a sliding block 22 and a support plate 23.

Figure 2:
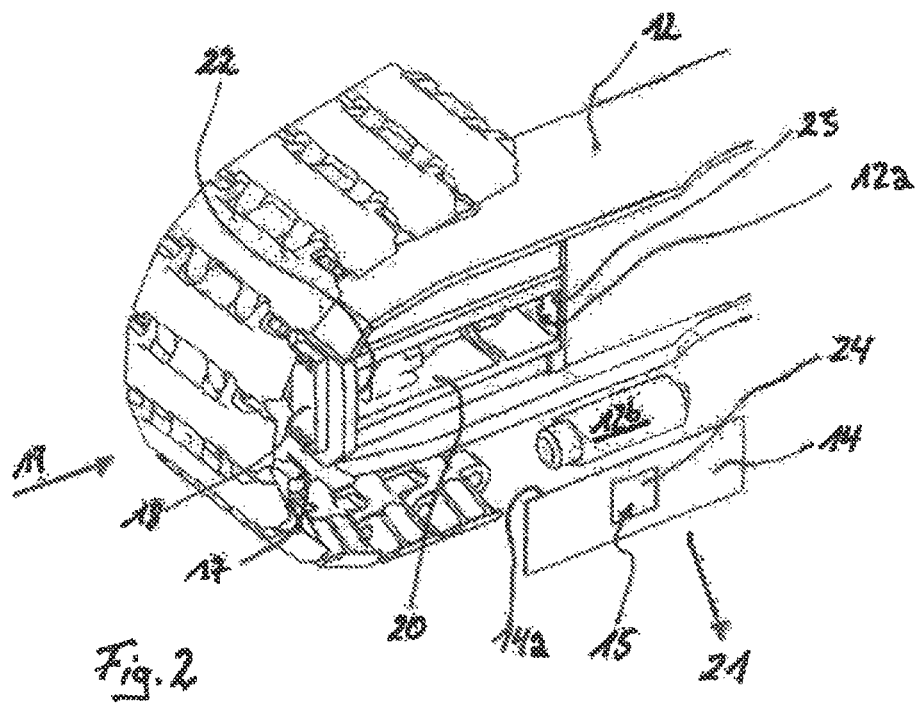
FIG. 2 the isometric view according to FIG. 1, with the tensioning unit being removed from the side carrier compartment.

As shown in FIG. 2, the cover 14 can be removed from the side carrier 12 to thereby clear the mounting opening 13.

This avoids the need to open the crawler track 16 and to remove it from the idler wheel 17 in order to be able to access the stop plate 18 of the side carrier 12.

In the past, dismantling of the stop plate 18 from the end face 19 of the side carrier 12 was complicated and the sliding block 22 with the idler wheel 17 had to be removed in order to gain access to the tensioning unit 12b. As a consequence of the novel mounting arrangement, the tensioning unit 12b can now be removed laterally out of the side carrier compartment 12a of the side carrier 12 through the mounting opening 13, as indicated by the arrow 21.

Figure 3:
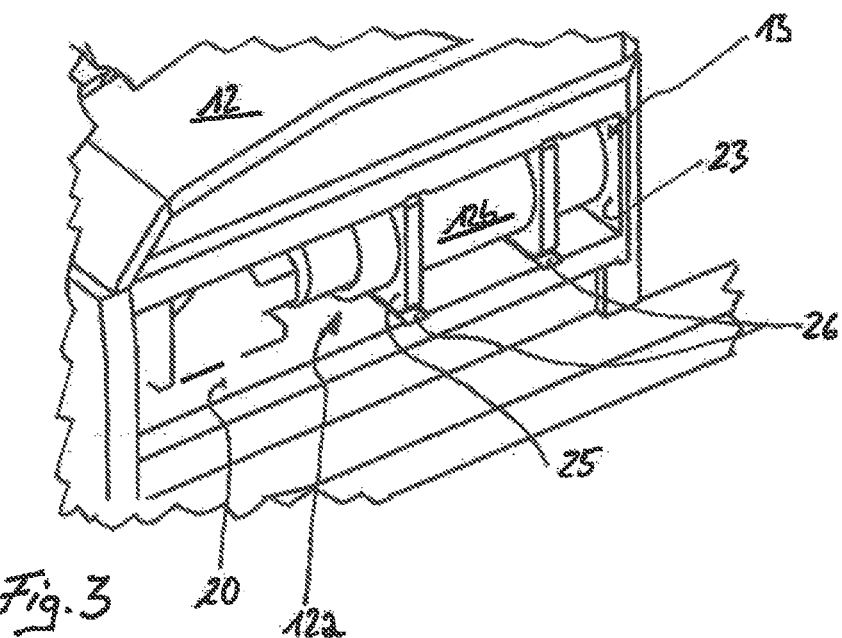
FIG. 3 a detailed isometric view of the mounting arrangement according to the invention with guide profiles placed into the bottom of the side carrier compartment for insertion of a pullout unit, with the tensioning unit being in operative connection with the pullout unit and being able to be pulled out together with the pullout unit from the side carrier compartment.

In order to facilitate removal of the tensioning unit 12b from the side carrier compartment 12a of the side carrier 12, the tensioning unit 12b can be securely mounted on a pullout unit 25, as illustrated in FIG. 3. The pullout unit 25 is movably mounted in or on guide profiles 26 formed in parallel relationship in the bottom 20 of the side carrier compartment 12a.

The pullout unit 25 can be inserted into the guide profiles and receive the tensioning unit 12b. The tensioning unit 12b together with the pullout unit 25 can now be pulled out transversely to the track running direction from the side carrier compartment 12a in the installation area 11 of the side carrier 12 through the mounting opening 13.

Latching the tensioning unit 12b for further transport is hereby considerably simplified, since the tensioning unit 12b can now be moved out laterally of the side carrier 12 and completely out of the side carrier compartment 12a to the outside.

Figure 4:
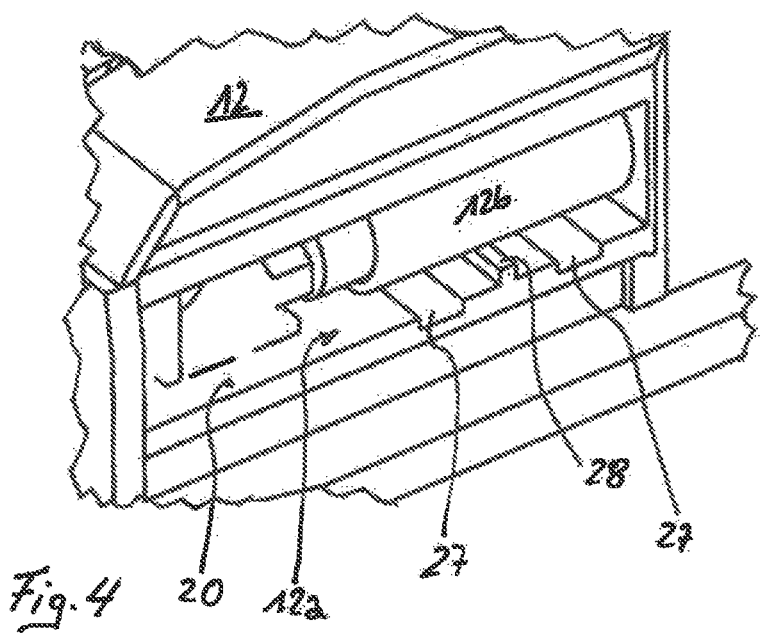
FIG. 4 a detailed isometric view of the mounting arrangement according to the invention with recesses arranged in parallel relationship in the bottom of the side carrier compartment and transversely to the track running direction for allowing insertion of the load-bearing means underneath the tensioning unit, so that the tensioning unit can be removed from a support and from the side carrier compartment.

As shown in FIG. 4, recesses 27 are provided in parallel relationship in the bottom 20 of the side carrier compartment 12a transversely to the track running direction for insertion of the mobile load-bearing means (not shown) underneath the tensioning unit 12b in order to be able to then remove the latter from at least one support 28 and to lift it out of the side carrier compartment 12a. A mobile load-bearing means involves hi particular a forklift or similar mobile devices.

The invention claimed is:

1. A mounting arrangement for a tensioning device with a tensioning unit in a side carrier of a crawler of a tracked undercarriage in a machne, the mounting arrangement comprising:
   a side carrier compartment in the side carrier of the crawler, with the tensioning unit arranged in the side carrier compartment, and with a mounting opening arranged in the side carrier on an outside of the side carrier in an installation area of tensioning unit, the mounting opening allowing removal of the tensioning unit, when installed, from the side carrier compartment through the mounting opening, transversely to a track running direction,
   a cover configured to close the mounting opening in a dust and water-repellent manner, wherein the cover has longitudinal sides profiled to form an undercut for formitting operative connection with a corresponding profile on a longitudinal side of the mounting opening; and
   guide profiles arranged on the longitudinal sides of the mounting opening for allowing insertion of the undercut of the cover.

2. The mounting arrangement of claim 1, further comprising a pullout unit insertable into the guide profiles and operatively connected to the tensioning unit, so that the tensioning unit together with the pullout unit is removable from the side carrier compartment transversely to the track running direction through the mounting opening.

3. A mounting arrangement for a tensioning device with a tensioning unit in a side carrier of a crawler of a tracked undercarriage in a machine, the mounting arrangement comprising:
- a side carrier compartment in the side carrier of the crawler, with the tensioning unit arranged in the side carrier compartment, and with a mounting opening arranged in the side carrier on an outside of the side carrier in an installation area of tensioning unit, the mounting opening allowing removal of the tensioning unit, when installed, from the side carrier compartment through the mounting opening, transversely to a track running direction; and
- guide profiles arranged in a bottom of the side carrier compartment transversely to the track running direction.

4. The mounting arrangement of claim 3, further comprising a pullout unit insertable into the guide profiles and operatively connected to the tensioning unit, so that the tensioning unit together with the pullout unit is removable from the side carrier compartment transversely to the track running direction through the mounting opening.

5. A mounting arrangement for a tensioning device with a tensioning unit in a side carrier of a crawler of a tracked undercarriage in a machine, the mounting arrangement comprising;
- a side carrier compartment in the side carrier of the crawler, with the tensioning unit arranged in the side carrier compartment, and with a mounting opening arranged in the side carrier on an outside of the side carrier in an installation area of tensioning unit, the mounting opening allowing removal of the tensioning unit, when installed, from the side carrier compartment through the mounting opening, transversely to a track running direction,
- wherein the side carrier compartment has a bottom formed with recesses transversely to the track running direction for allowing insertion of a mobile load-bearing device underneath the tensioning unit.

6. The mounting arrangement of claim 5, wherein the tensioning unit is removable from the side carrier compartment through the mounting opening via the load-bearing device from at least one support transversely to the track running direction.

7. The mounting arrangement of claim 5, further comprising a pullout unit insertable into the guide profiles and operatively connected to the tensioning unit, so that the tensioning unit together with the pullout unit is removable from the side carrier compartment transversely to the track running direction through the mounting opening.

* * * * *